United States Patent [19]
Koike et al.

[11] Patent Number: 6,043,858
[45] Date of Patent: Mar. 28, 2000

[54] LIQUID CRYSTAL DISPLAY DEVICE CAPABLE OF IMPROVING PATTERN ALIGMENT

[75] Inventors: Satofumi Koike; Yuji Hayashi, both of Kanagawa, Japan

[73] Assignee: Sony Corporation, Tokyo, Japan

[21] Appl. No.: 08/242,602

[22] Filed: May 13, 1994

[30] Foreign Application Priority Data

May 18, 1993 [JP] Japan .................................. 5-139580

[51] Int. Cl.⁷ .............................................. G02F 1/1333
[52] U.S. Cl. ........................................ 349/110; 349/158
[58] Field of Search ............................... 359/82, 54, 67; 349/158, 110

[56] References Cited

U.S. PATENT DOCUMENTS

| | | | |
|---|---|---|---|
| 4,526,818 | 7/1985 | Hoshikawa et al. | 359/82 |
| 4,597,636 | 7/1986 | Hoshikawa | 359/87 |
| 5,258,866 | 11/1993 | Ishikawa et al. | 359/88 |

FOREIGN PATENT DOCUMENTS

| | | | |
|---|---|---|---|
| 57-191617 | 11/1982 | Japan | 359/82 |
| 1200328 | 8/1989 | Japan | 359/82 |
| 4143733 | 5/1992 | Japan | 359/82 |
| 5346579 | 12/1993 | Japan | 359/82 |

*Primary Examiner*—William L. Sikes
*Assistant Examiner*—James A. Dudek
*Attorney, Agent, or Firm*—Hill & Simpson

[57] ABSTRACT

In a liquid crystal display device, positional shifts in patterns formed on an upper substrate and a lower substrate are reduced. The liquid crystal display device is arranged by one pair of substrates whose thermal expansion coefficients are different from each other, the substrates being mutually attached to each other via a predetermined space, predetermined patterns formed on inner surfaces of the respective substrates and positionally aligned to each other, a dimension of one pattern being previously and adjustably set with respect to a dimension of the other pattern based upon a difference existing in the thermal expansion coefficients of the paired substrates; and liquid crystal held in the predetermined space defined by the paired substrates.

1 Claim, 7 Drawing Sheets

LIQUID CRYSTAL DISPLAY DEVICE CAPABLE OF IMPROVING PATTERN ALIGMENT

BACKGROUND OF THE INVENTION

The present invention generally relates to a liquid crystal display device. More specifically, the present invention is directed to a size design of a pattern formed on inner surfaces of substrates located opposite to each other in the liquid crystal device.

Figure 1:
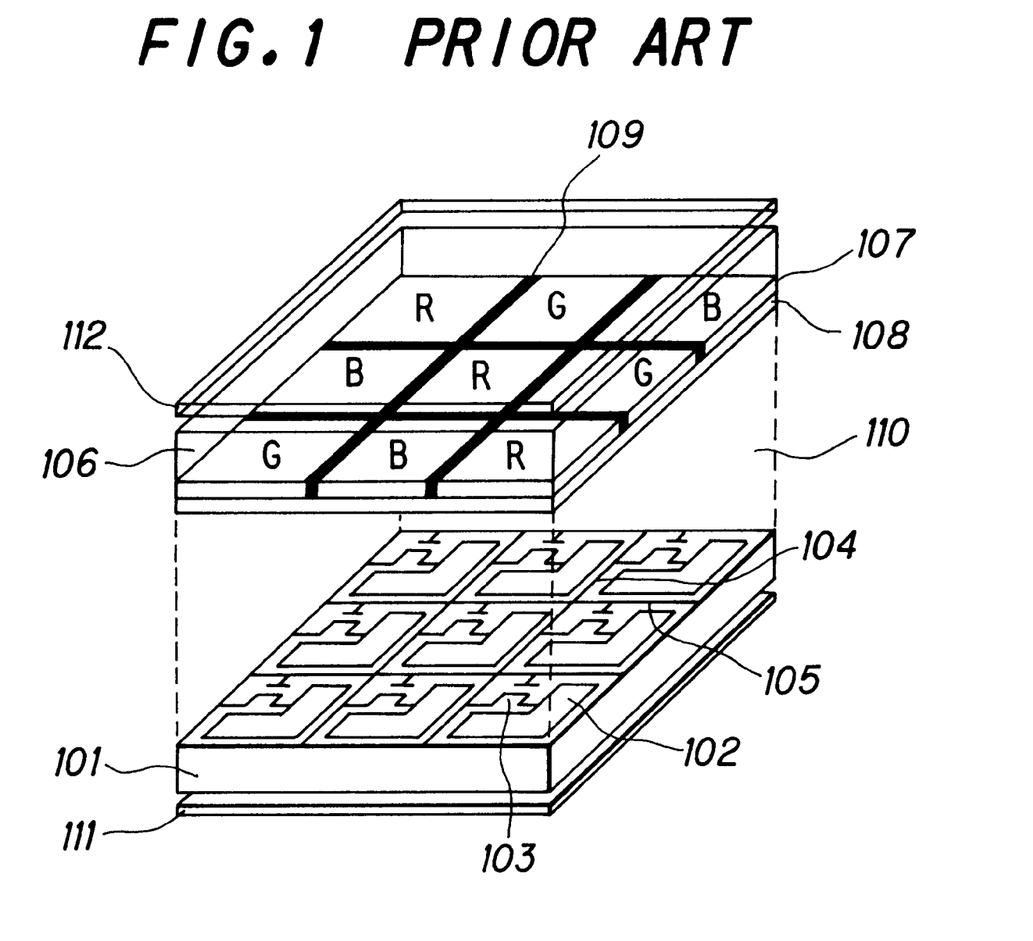
FIG. 1 is a perspective view of the conventional active matrix type liquid crystal display device.

For a better understanding of the background of the present invention, an example of the conventional liquid crystal display device will now be described with reference to FIG. 1. FIG. 1 is a perspective view of this conventional liquid crystal display device. As illustrated in FIG. 1, a matrix pixel array is formed on an inner surface of one substrate 101. Each of pixel arrays is constructed of a pixel electrode 102 obtained by patterning a transparent conductive film and a thin-film transistor (abbreviated as "TFT" hereinafter) 103 used to drive the liquid crystal display device. A drain electrode of each TFT 103 is connected to the pixel electrode 102 located opposite to this drain electrode, a source electrode thereof is connected to a data line 104, and a gate electrode is connected to a scanning line 105. Such a substrate 101, which has these thin-film transistors (TFTs) formed in an integral form, will be hereinafter referred to as a "TFT substrate". In case that, for instance, polysilicon is employed as the semiconductor thin-film material of the TFT, since the high temperature process at approximately 1,000° C. is carried out in the semiconductor manufacturing process, the TFT substrate 101 is made of a material having a better heat resisting characteristic, e.g., quartz. A color filter (CF) 107 made of three primary color (RGB) segments and a counter electrode 108 are stacked on an inner surface of the other substrate 106. The respective color filter segments are aligned with the pixels. A black mask 109 is patterned so as to shield the non-effective portion of the respective pixels and improve contrast of the liquid crystal display device. As described above, specifically, since the high temperature process is not carried out during the manufacturing process for the substrate 106 on which the color filter and the black mask and the like have been patterned (will be hereinafter referred to as to a "CF substrate"), relatively low cost materials such as glass may be used. A space defined between the TFT substrate 101 and the CF substrate 106 is filled with a liquid crystal layer 110. Furthermore, polarizing plates 111 and 112 are attached to outer surfaces of both of the substrates 101 and 106. When the TFT 103 is brought into the conductive state via the scanning line 105 for each row, an image (picture) signal supplied from the data line 104 is written into the respective pixel electrodes 102. In response to the written image signal, a voltage is applied between the pixel electrode 102 and the counter electrode 108 to change the molecular orientation or configuration of the liquid crystal layer 110. This change is derived as a variation of transmittance via one pair of polarizing plates 111 and 112 to display an image. The liquid crystal display device with the above-explained structure is called an active matrix type liquid crystal display device. It should be understood that the liquid crystal display device (LCD) in accordance with the present invention is not limited to this active matrix type LCD, but also any other type of LCDs.

Figure 2A:
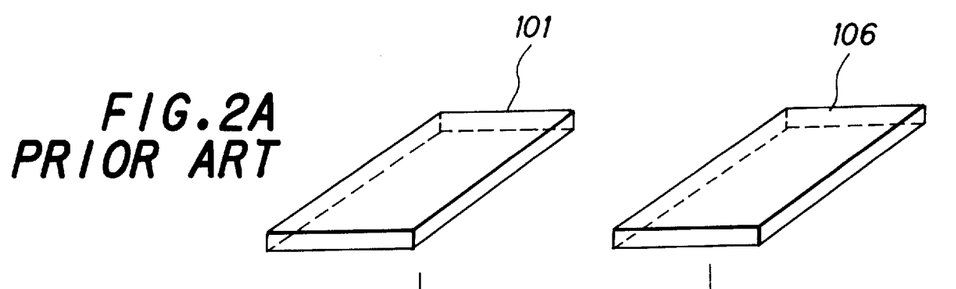
FIGS. 2A to 2D are explanatory diagrams for representing the general assembling stage of the conventional liquid crystal display device.
Figures 2B, 2C:
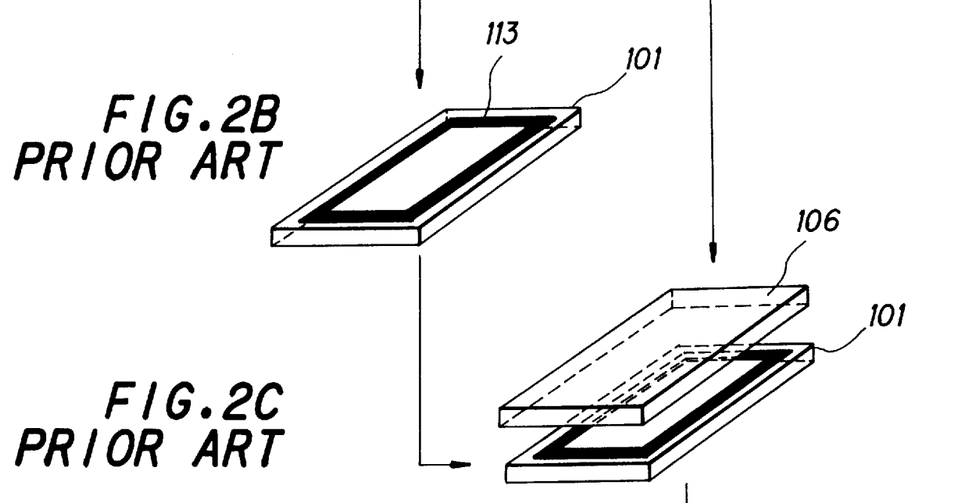
Figure 2D:
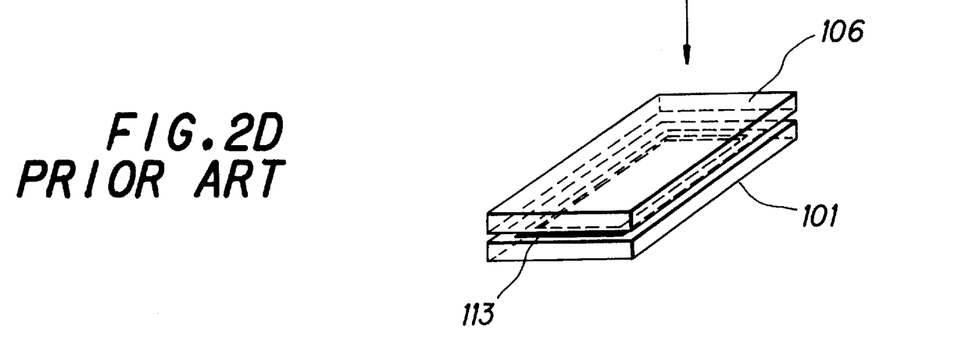

Next, a brief description will be made of the assembling stage of the liquid crystal display device shown in FIG. 1 with reference to FIGS. 2A–2D. First, the TFT substrate 101 and the CF substrate 106 are prepared at a first stage shown in FIG. 2A. As previously stated, this TFT substrate 101 is made of quartz or the like having the heat resisting characteristics, and the thin-film transistors and the pixel electrodes are formed on one surface of the TFT substrate 101 is an integral form. It should be noted that the thermal expansion coefficient is relatively small, on the order of $5 \times 10^{-7}$ cm/°C. On the other hand, the CF substrate 106 is made of glass and the like, and the color filters, black mask, counter electrodes and the like have been previously formed on one surface of this CF substrate 106. It should also be noted that the thermal expansion coefficient is relatively large, on the order of $40 \times 10^{-7}$ cm/°C. As a consequence, the thermal expansion coefficient of the TFT substrate 101 is greatly different from that of the CF substrate 106 by 1 order. It should be understood that the orientation process has been previously performed on one surface of the respective substrates. Thereafter, a sealing member 113 is printed and applied along the periperal portion of the TFT substrate 101 as shown in FIG. 2B. Alternatively, the sealing member 113 may be printed and applied to the CF substrate 106 instead of the TFT substrate 101. This sealing member is made of thermosetting adhesive agent. Both of these substrates 101 and 106 are positionally aligned with each other at the subsequent stage (see FIG. 2C). That is, the pixel electrode pattern formed on the TFT substrate 101 is mutually and positionally aligned with the black mask pattern formed on the CF substrate 106. Finally, a heating process at approximately 150° C. is carried out with giving constant weight to harden the sealing member 113 made of the thermosetting adhesive agent at a stage shown in FIG. 2D. As a result, the TFT substrate 101 and the CF substrate 106 are attached to each other with a predetermined space therebetween, so that a so-called "cell structure" is obtained. Finally, a liquid crystal layer is sealed and filled within this predetermined space, whereby the liquid crystal display device is accomplished. It should be noted that although the thermosetting adhesive agent is employed as the sealing member in the above-described example, ultraviolet hardening type adhesive agent may be alternatively utilized as disclosed in, for instance, Japanese Patent KOKAI (Laid-open) Application No. 61-112128 (1986). However, it is practically difficult to obtain sufficient adhesive strength by the ultraviolet hardening type adhesive agent, which may cause poor reliability. As a result, even when such a ultraviolet hardening type adhesive agent is employed, the heating process (for example, at approximately 90° C.) is carried out at the succeeding stage to emphasize adhesive strengths.

Figure 3:
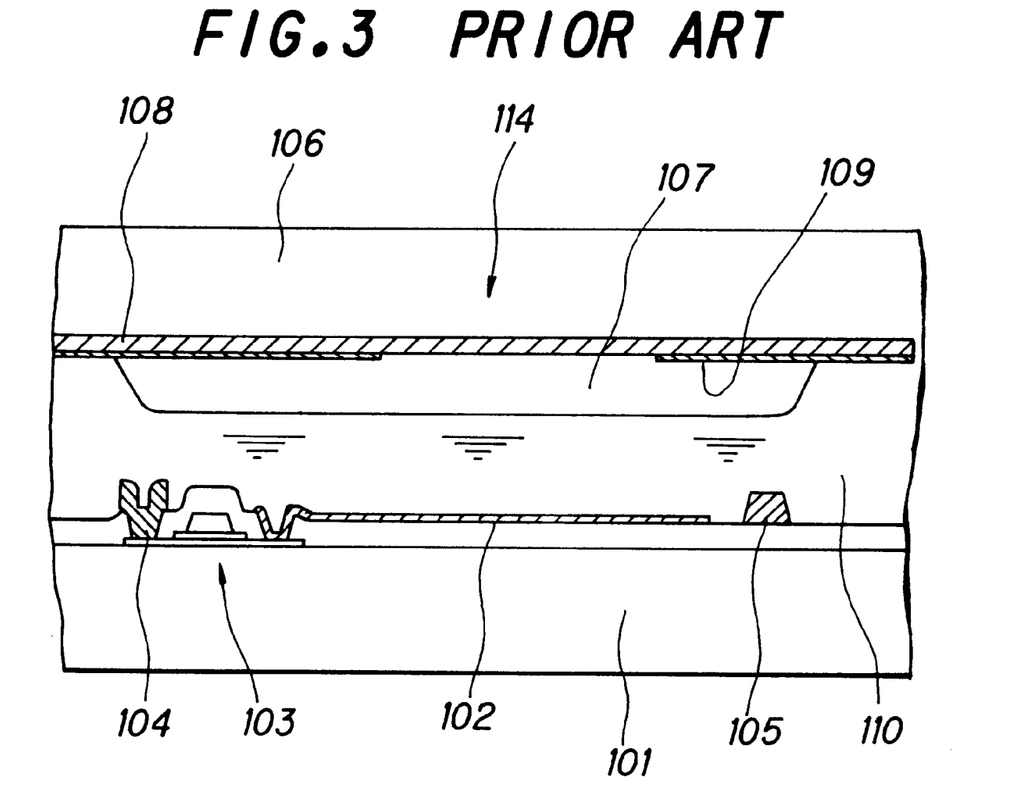
FIG. 3 is a partially enlarged sectional view of the conventional active matrix type liquid crystal display device.

FIG. 3 is a sectional view of an active matrix type liquid crystal display device from which one pixel portion is cut away. The pixel is formed on the TFT substrate 101. This pixel is constructed of a pixel electrode 102 and a thin-film transistor 103 for driving this pixel electrode 102, and the like. In addition, a data line 104 used to supply an image (picture) signal to the thin-film transistor 103, and also a scanning line 105 used to supply a selecting signal are fabricated. The CF substrate 106 is arranged at a predetermined space with respect to this TFT substrate 101. A counter electrode 108, a black mask 109, and a color filter 107 are formed on an inner surface of the CF substrate 106. A liquid crystal layer 110 with, for example, twisted nematic orientation is held between the TFT substrate 101 and the CF substrate 106. An opening 114 aligned to the pixel electrode 102 is formed in the black mask 109. That is, an effective display region on the pixel electrode 102 is exposed and also a non-effective display region is shielded from incident light by way of the black mask 109. This non-effective display region includes the above-described thin-film transistor 103, data line 104, and scanning line 105 and so on.

As previously explained, the black mask 109 is used so as to improve display contrast by irradiating the incoming light only to the effective display region. As a consequence, the pattern of the pixel electrode 102 must be precisely aligned with the pattern of the black mask 109. Assuming now that the pattern of the pixel electrode 102 would be positionally shifted from the pattern of the black mask 109, a so-called "light pass-through" phenomenon happens to occur in the non-effective display region by the opening 114 of the black mask 109, resulting in lowering of display contrast. In general, approximately 1 micron is required for the positional alignment precision of these patterns in case of such a compact display device having a size of approximately 1 inch when high precision could be achieved. However, there is a great difference of 1 order between the thermal expansion coefficients of the TFT substrate 101 and the CF substrate 106. Even when the positional alignment between these substrates 101 and 106 would be performed before assembling the cell, a positional shift would be produced after the liquid crystal display device has been assembled by performing the heating process. The positional shift error would become about 2 microns, for instance. Accordingly, if no measure is taken, then such a problem as the so-called "light pass-through" phenomenon would be produced, resulting in deterioration of the display contrast.

SUMMARY OF THE INVENTION

To solve the above-described various problems of the conventional liquid crystal display device, the present invention has been made with comprising the following means. That is, a liquid crystal display device, according to the present invention, basically comprises such a cell structure that a pair of substrates having different thermal expansion coefficients from each other are mutually attached to each other via a predetermined space. Preselected patterns are provided on inner surfaces of these substrates, which are positionally aligned to each other, and a liquid crystal is held by this space. A major feature of the present invention is that a dimension of one pattern is previously and adjustably set to another dimension of the other pattern based upon the above-described difference in the thermal expansion coefficients of these substrates. In a concrete example, the pattern formed on the substrate having the larger thermal expansion coefficient is previously made reduced. Conversely, the pattern formed on the substrate having the smaller thermal expansion coefficient may be previously made enlarged. Such a structure may be applied to, for example, an active matrix type liquid crystal display device. In this case, the black mask pattern is fabricated on the substrate whose thermal expansion coefficient is large, whereas the pixel electrode pattern is formed on the substrate whose thermal expansion coefficient is small. The substrate with the larger thermal expansion coefficient is made of glass, whereas the substrate with smaller thermal expansion coefficient is made of quartz.

In accordance with the present invention, the dimension of one pattern is previously and adjustably set to the dimension of the other pattern in such a manner that the difference existing in the thermal expansion coefficients of both substrates mutually attached to each other can be absorbed. As a result, a preselected positional shift is contained in both of these patterns before these substrates are attached to each other. After the positional alignment is carried out under this condition, when both of these substrates are attached to each other under the thermal process, both of these substrates are relatively moved in order to absorb the above-explained initial positional shift due to an occurrence of thermal expansion. One pair of substrates are fixed with each other under such a condition that both of these patterns have been aligned to each other. For instance, when the pattern provided on the substrate, whose thermal expansion coefficient is large, is previously made reduced, this substrate is relatively thermal-expanded with respect to the other substrate having the small thermal expansion coefficient after being thermally processed, whereby precise pattern alignment could be finally obtained.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENT

Referring now to drawings, a liquid crystal display device according to a preferred embodiment of the present invention will be described in detail.

Figure 4A:
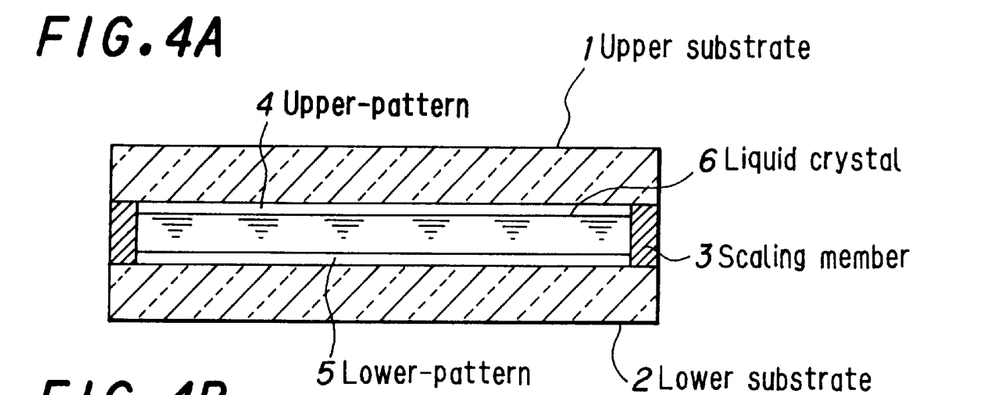
FIGS. 4A to 4C schematically show a liquid crystal display device according to an embodiment of the present invention.

FIG. 4 schematically shows a liquid crystal display device according to one preferred embodiment of the present invention. As shown in FIG. 4A, this liquid crystal display device comprises such a cell structure that a pair of an upper substrate 1 and a lower substrate 2, whose thermal expansion coefficients are different from each other, are attached to each other with a predetermined spacing therebetween. In this embodiment, both of the upper substrate 1 and the lower substrate 2 are joined with each other by a sealing member 3 made of thermosetting type adhesive agent. It should be noted that such an adhesive agent material and a thermosetting material may be alternatively employed instead of this thermosetting type adhesive agent. The upper substrate 1 is made of a glass material and the like, having a relatively large thermal expansion coefficient, whereas the lower substrate 2 is made of a quartz material and the like, having a relatively small thermal expansion coefficient. A predetermined pattern 4 and a predetermined pattern 5 which is positionally aligned with the first-mentioned pattern 4, are formed on each of inner surfaces of these upper and lower substrates 1 and 2, respectively. Liquid crystal 6 is held in the space formed between the upper substrate 1 and the lower substrate 2. As a concrete example, this liquid crystal display device with the above-described cell structure may be an active matrix type liquid crystal display device. In this case, the upper substrate 1 functions as the CF substrate, and a black mask and the like are contained in the upper pattern 4. On the other hand, the lower substrate 2 functions as the TFT substrate, and the pixel electrode and the like are contained in the lower pattern 5. It should be noted that the present invention is not limited to the above-explained active matrix type liquid crystal display device, but may be applied to any other types of liquid crystal display devices basically equipped with such a cell structure that one pair of substrates whose thermal expansion coefficients are different from each other are attached to each other, in which predetermined patterns mutually aligned to each other are formed on inner surfaces of the respective substrates.

Figure 4B:
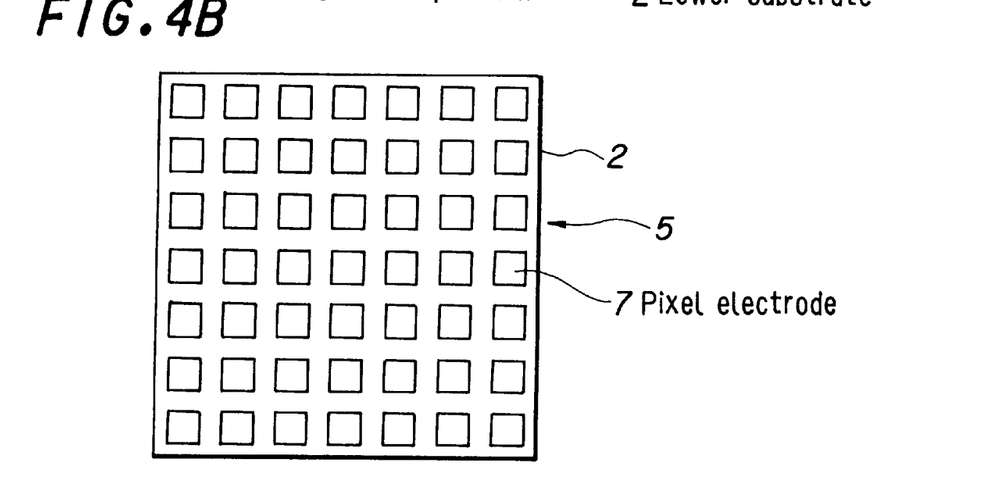

In case of the active matrix type liquid crystal display device, as illustrated in FIG. 4B, the lower substrate 2 contains a matrix-shaped pixel electrode 7 as the lower pattern 5. This pixel electrode 7 is arranged in such a manner that a pitch of this pixel electrode 7 is constant, and an area thereof is constant in accordance with a preset dimension.

Figure 4C:
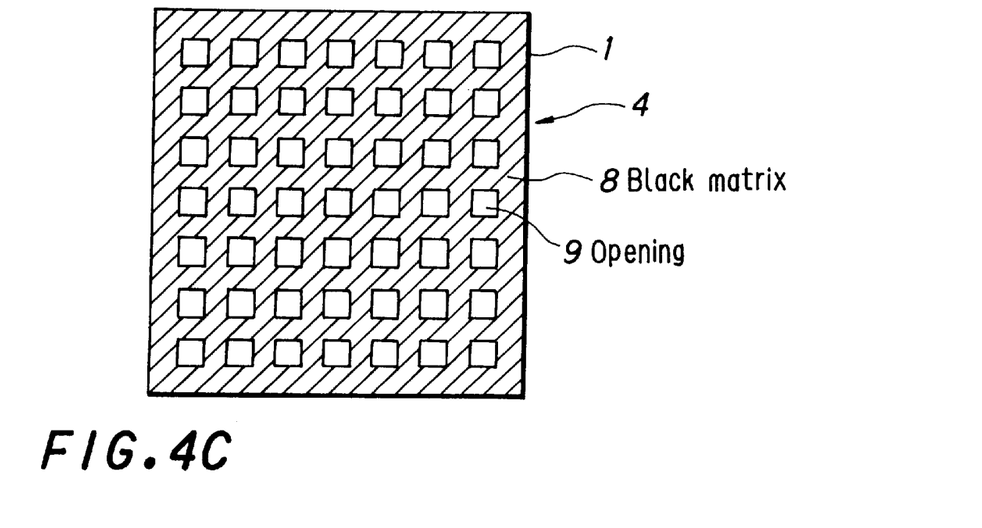
Figure 5A:
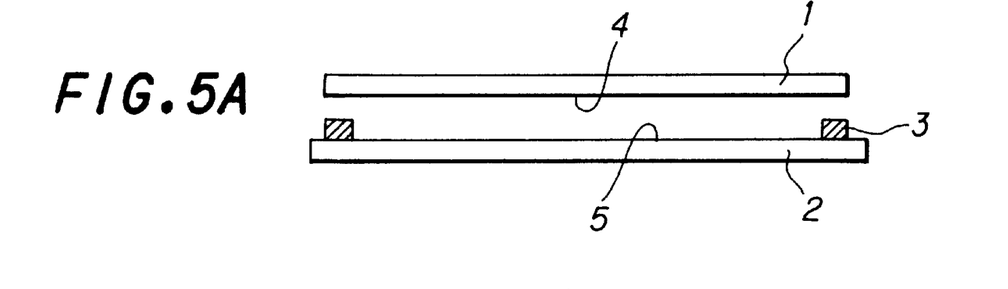
FIGS. 5A to 5D schematically illustrate a manufacturing stage of the liquid crystal display device shown in FIG. 4.
Figure 5B:
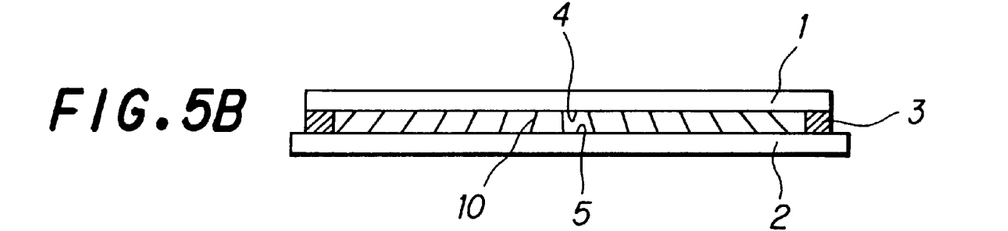
Figure 5C:
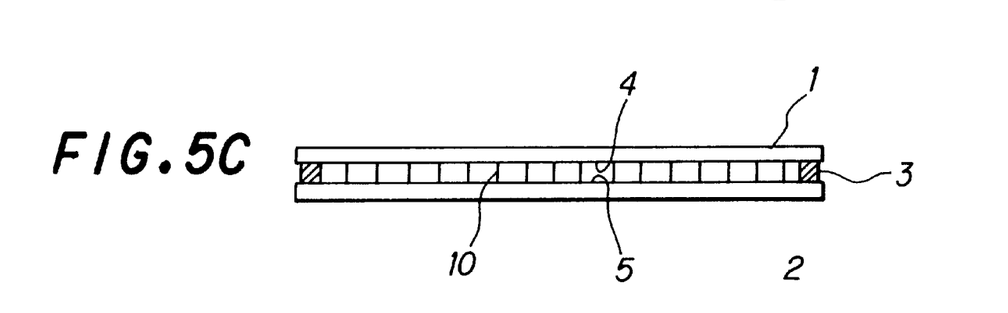
Figure 5D:
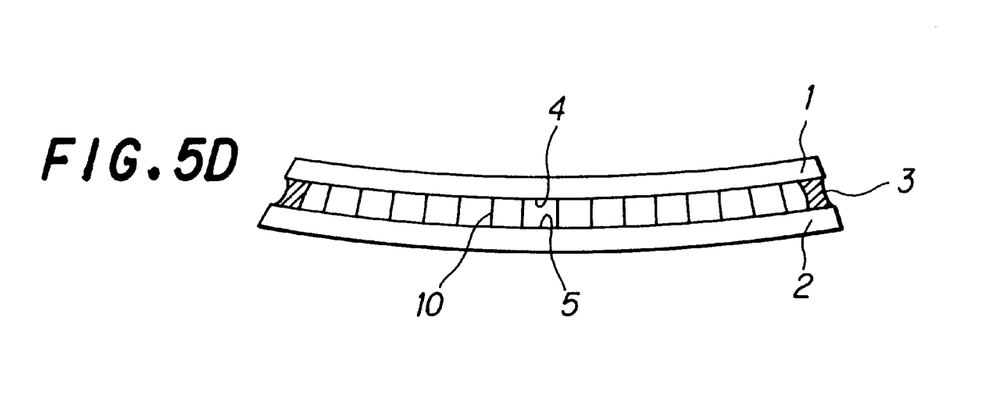

On the other hand, are represented in FIG. 4C, a black mask 8 is formed as the upper pattern 4 on the surface of the upper substrate 1. This black mask 8 has openings 9 which are arranged in a matrix form. The openings 9 are made with reduced dimensions, as compared with the preset pitch and area. In other words, the respective openings 9 constitute a reduced pattern shape in such a manner that these openings are collected toward a center of the upper substrate 1.

Next, a description will now be made of a method for assembling a cell of the liquid crystal display device in detail with reference to FIGS. 5A–5D. At a first stage of FIG. 5A, a sealing member 3 is printed and applied along a peripheral portion of at least one substrate. In this embodiment, the sealing member 3 is applied to the inner surface of the lower substrate 2. At this stage, the pattern 4 shown in FIG. 4C has been fabricated on the inner surface of the upper substrate 1. Similarly, the pattern 5 indicated in FIG. 4B has been formed on the inner surface of the lower substrate 2. At the subsequent stage of FIG. 5B, both of the upper substrate 1 and the lower substrate 2 are mutually and positionally aligned with each other. As previously described, since the upper pattern 4 is relatively reduced to the center of the upper substrate 1, as compared with the lower pattern 5, the upper pattern 4 is not positionally aligned with the lower pattern 5. The corresponding relationship between the upper pattern 4 and the lower pattern 5 is indicated by an auxiliary line 10. At the next stage shown in FIG. 5C, a heating process is carried out under application of pressure, so that the sealing member 3 is hardened to mutually attach the upper substrate 1 to the lower substrate 2. The drawing shows a cell under heating condition at a certain pressure. As previously explained, the upper substrate 1 has the larger thermal expansion coefficient than that of the lower substrate 2. As a result, the upper pattern 4 formed on the inner surface of the upper substrate 1 is relatively expanded. As a consequence, the upper pattern 4 is precisely and positionally aligned with the lower pattern 5, as illustrated by the auxiliary line 10 in FIG. 5C. The sealing member 3 is hardened while this positional alignment is maintained, so that both of the upper substrate 1 and the lower substrate 2 are mutually joined and fixed with each other. Finally, liquid crystal is filled into a space made between the upper substrate 1 and the lower substrate 2 at a last stage of FIG. 5D. At this stage, the cell is kept at the room temperature, and the upper substrate 1 relatively shrinks with respect to the lower substrate 2. However, both of the upper substrate 1 and the lower substrate 2 have been firmly joined and fixed by way of the sealing member 3. As a consequence, although there are some possibilities that distortion may be produced and the cell would be slightly deformed, the alignment relationship between the upper pattern 4 and the lower pattern 5 may be held as represented by the auxiliary line 10.

Figure 6A:
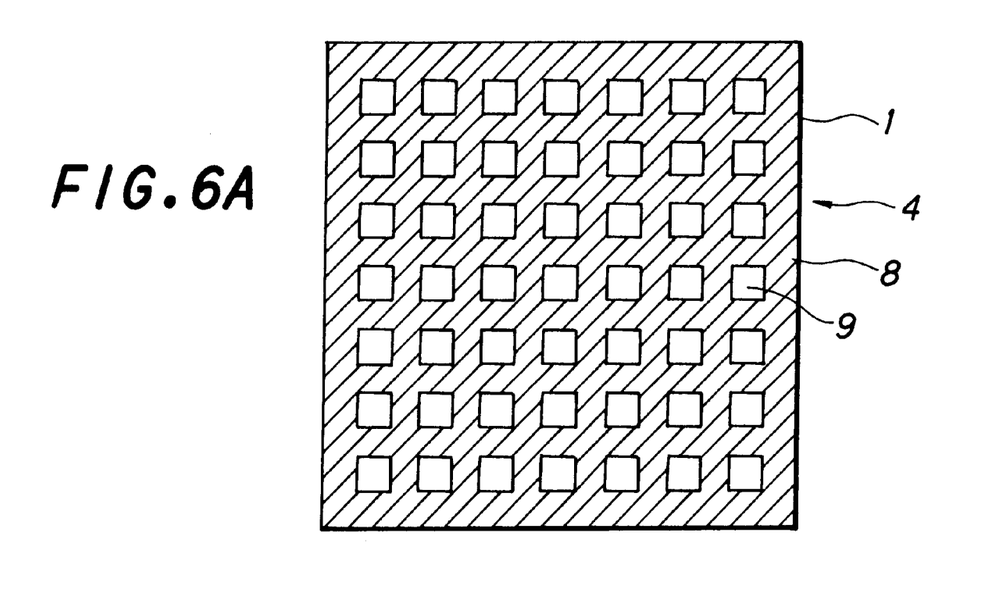
FIGS. 6A and 6B schematically represent another pattern example related to the embodiment shown in FIG. 4.
Figure 6B:
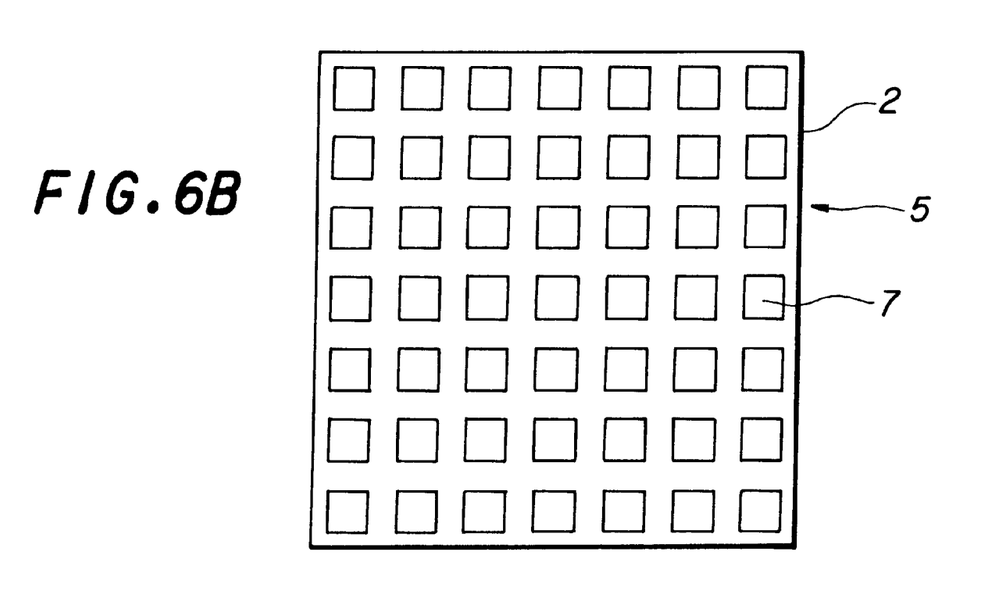

FIG. 6 schematically illustrates another example of a pattern used in the liquid crystal display device shown in FIG. 4. The same reference numerals indicated in FIG. 4 are employed as those for denoting the same or similar elements shown in FIG. 6 for the sake of easy understanding. A different point from the first pattern example of FIG. 4 is such that while the upper pattern 4 formed on the upper substrate 1 is fabricated based on the set value, as illustrated in FIG. 6A, whereas the lower pattern 5 formed on the lower substrate 2 is previously made enlarged from the center of this lower substrate 2 to the peripheral portion thereof, as illustrated in FIG. 6B. With such a manufacturing method, the upper substrate 1 is relatively expanded, as compared with the lower substrate 2, since the heating process under a certain pressure is performed at the cell assembling stage. Finally, the upper pattern 4 becomes enlarged and can be positionally aligned with the lower pattern 5.

Figure 7:
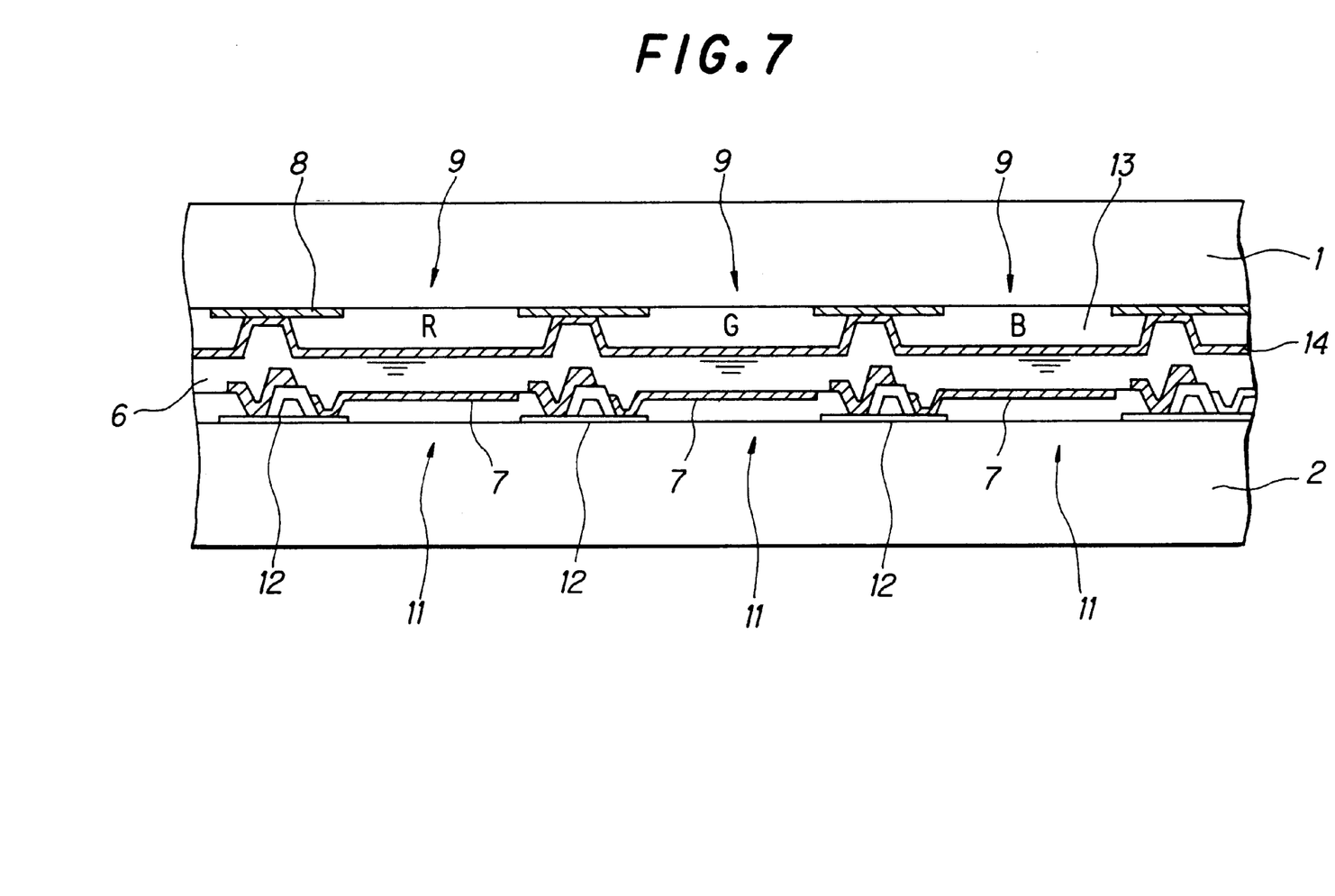
FIG. 7 is a sectional view for showing in detail the liquid crystal display device of FIG. 4.

Furthermore, in FIG. 7, there is shown a sectional view of an active matrix type liquid crystal display device which has been assembled in accordance with the above-described manner. As illustrated in this drawing, a matrix-arranged pixel 11 is fabricated on the lower substrate (TFT substrate) 2. It should be noted that only three pixels are represented in FIG. 7 for the sake of simple representation. Each pixel 11 is constructed of a pixel electrode 7, a thin-film transistor 12 for driving this pixel electrode 7, and so on. The upper substrate (CF substrate) 1 is arranged via a predetermined space with respect to this lower substrate 2. A black mask 8, a color filter 13, and a counter electrode 14 are formed on the inner surface of the upper substrate 1. The color filter 13 contains three primary color (RGB) segments. Between the CF substrate 1 and the TFT substrate 2, liquid crystal 6 which is, for instance, twisted-nematic-oriented is held. An opening 9 is formed in the black mask 8, which is positionally aligned with the pixel electrode 11. The respective openings 9 are positionally aligned with the corresponding pixels 11 in high precision at the stage when the cell has been assembled. That is, the opening 9 is employed to expose the effective display region of the pixel electrode 7 and also to shield the non-effective display region from the light incident upon this active matrix type liquid crystal display device. The non-selective display region contains the thin-film transistor 12 and the like. The black mask 8 is employed to limit irradiation of the incident light only through the opening 9 and only to the effective display region, thereby improving the display contrast. In accordance with the present invention, each of the openings 9 is positionally aligned with each of the corresponding pixel electrodes 7 in higher precision, as compared with that of the conventional liquid crystal display device. Accordingly, there is no risk of light leakage, and it is possible to maintain display contrast at a higher level, as compared with that of the conventional liquid crystal display device.

As previously described in detail, the liquid crystal display device according to the present invention has such a cell structure that one pair of substrates whose thermal expansion coefficients are different from each other are mutually attached with a predetermined space, in which preselected patterns mutually aligned to each other are formed on the inner surfaces of the respective substrates, and liquid crystal is filled with this space. This liquid crystal display device has a feature point that the dimension of one substrate is previously and adjustably set with respect to the dimension of the other substrate based upon a difference between the thermal expansion coefficients of both substrates. There is an advantage that the positional shifts in these patterns occurred after both of the upper and lower substrate have been attached with each other and can be prevented. For instance, when one pattern is the black mask and the other pattern is the pixel electrode, both of the black mask and the pixel electrode are positionally aligned to each other with a high precision, so that a so-called "light pass-through" phenomenon can be prevented and high display contrast can be achieved. Moreover, there is another merit which is that since the substrates having the different thermal expansion coefficients may be employed, a variety in the selection of the substrate material can be increased or widened, and also the manufacturing cost of the liquid crystal display device can be lowered.

What is claimed is:

1. In a method of forming a liquid crystal display having a first substrate with a surface with a first pattern of pixel electrodes joined to a second substrate having a surface facing the electrodes with a black mask pattern aligned with the first pattern with a space therebetween receiving a liquid crystal by using a thermosetting sealing material and applying heat and pressure so that the sealing material bonds the substrate together, the improvements comprising selecting a first substrate having a first coefficient of thermal expansion smaller than a second coefficient of thermal expansion of the second substrate, presetting the first pattern to have a dimension greater than a preset dimension of the black mask pattern by an amount equal to the difference of the thermal expansion of the first and second substrates during the step of applying heat and pressure, aligning the center of the first pattern with the center of the black mask pattern and then applying the heat and pressure to bond the substrates together with the space therebetween so that after cooling, the first pattern and mask pattern are aligned across the surfaces of the substrates.

* * * * *